(12) United States Patent
Schmalenberg et al.

(10) Patent No.: US 11,125,878 B2
(45) Date of Patent: Sep. 21, 2021

(54) PHOTONIC APPARATUS USING A PHASE ALIGNMENT WAVEGUIDE

(71) Applicant: Toyota Motor Engineering & Manufacturing North America, Inc., Erlanger, KY (US)

(72) Inventors: Paul Donald Schmalenberg, Ann Arbor, MI (US); Tsuyoshi Nomura, Novi, MI (US); Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 754 days.

(21) Appl. No.: 15/832,239

(22) Filed: Dec. 5, 2017

(65) Prior Publication Data

US 2019/0170875 A1 Jun. 6, 2019

(51) Int. Cl.
| | |
|---|---|
| *G01S 17/32* | (2020.01) |
| *G02B 6/28* | (2006.01) |
| *G01S 7/481* | (2006.01) |
| *G01S 7/4915* | (2020.01) |
| *G02B 6/35* | (2006.01) |
| *G01S 17/42* | (2006.01) |

(52) U.S. Cl.
CPC ............ *G01S 17/32* (2013.01); *G01S 7/4814* (2013.01); *G01S 7/4817* (2013.01); *G01S 7/4915* (2013.01); *G01S 17/42* (2013.01); *G02B 6/2804* (2013.01); *G02B 6/3586* (2013.01); *G01S 7/4818* (2013.01)

(58) Field of Classification Search
CPC ...... G01S 17/32; G01S 7/4814; G01S 7/4817; G01S 7/4915; G01S 17/42; G01S 7/4818; G02B 6/2804; G02B 6/3586
See application file for complete search history.

(56) References Cited

U.S. PATENT DOCUMENTS

| | | |
|---|---|---|
| 3,170,158 A | 2/1965 | Rotman |
| 5,125,736 A * | 6/1992 | Vaninetti ................. G01S 17/08 342/103 |
| 5,426,437 A | 6/1995 | Cross et al. |

(Continued)

*Primary Examiner* — Yuqing Xiao
*Assistant Examiner* — Amir J Askarian
(74) *Attorney, Agent, or Firm* — Christopher G. Darrow; Darrow Mustafa PC

(57) ABSTRACT

System, methods, and other embodiments described herein relate to a photonic apparatus. The photonic apparatus including a phase alignment waveguide including waveguide inputs and waveguide outputs. The waveguide inputs being operably connected with a light source to provide a light wave into the phase alignment waveguide and the waveguide outputs providing a plurality of light waves from the optical waveguide. The phase alignment waveguide modulates the light wave to generate the plurality of light waves with different phases. The photonic apparatus includes a transmit switch operably connected with the waveguide inputs to selectively connect at least one of the waveguide inputs with the light source to provide the light wave into the phase alignment waveguide. The photonic apparatus includes control circuitry operably connected with the transmit switch, the control circuitry dynamically activating the at least one of the waveguide inputs according to an electronic control signal.

19 Claims, 9 Drawing Sheets

(56) References Cited

U.S. PATENT DOCUMENTS

| | | | | |
|---|---|---|---|---|
| 5,677,697 | A * | 10/1997 | Lee | G01S 7/282 |
| | | | | 342/368 |
| 5,926,298 | A * | 7/1999 | Li | G02B 6/12021 |
| | | | | 385/24 |
| 6,956,653 | B1 * | 10/2005 | Lam | G02B 6/12 |
| | | | | 356/477 |
| 7,485,862 | B2 | 2/2009 | Danziger | |
| 7,728,772 | B2 | 6/2010 | Mortazawi et al. | |
| 8,976,061 | B2 | 3/2015 | Chowdhury | |
| 9,575,341 | B2 | 1/2017 | Heck et al. | |
| 9,588,290 | B2 | 3/2017 | Munoz Munoz et al. | |
| 10,261,389 | B2 * | 4/2019 | Skirlo | G02F 1/2955 |
| 2003/0107793 | A1 * | 6/2003 | Capps | G01S 7/4811 |
| | | | | 359/290 |
| 2007/0285314 | A1 * | 12/2007 | Mortazawi | H01Q 1/3233 |
| | | | | 342/375 |
| 2010/0040380 | A1 * | 2/2010 | Lewin | H04Q 11/0005 |
| | | | | 398/158 |
| 2010/0196005 | A1 * | 8/2010 | Wada | H04K 1/006 |
| | | | | 398/45 |
| 2010/0296077 | A1 * | 11/2010 | Scott | G01S 7/4818 |
| | | | | 356/4.01 |
| 2011/0182545 | A1 * | 7/2011 | Ishikawa | G02B 6/2773 |
| | | | | 385/16 |
| 2012/0002924 | A1 | 1/2012 | Okayama | |
| 2012/0243823 | A1 * | 9/2012 | Giboney | H01P 1/162 |
| | | | | 385/14 |
| 2012/0257653 | A1 | 10/2012 | Nagaishi et al. | |
| 2016/0344156 | A1 * | 11/2016 | Rothberg | G01N 21/6408 |
| 2017/0184450 | A1 * | 6/2017 | Doylend | G01S 7/4817 |
| 2017/0371103 | A1 * | 12/2017 | Chan | H04B 10/25 |
| 2019/0004151 | A1 * | 1/2019 | Abediasl | G02B 26/0883 |
| 2019/0004394 | A1 * | 1/2019 | Shin | G01S 17/42 |
| 2019/0101647 | A1 * | 4/2019 | Feshali | G01S 17/42 |
| 2019/0391243 | A1 * | 12/2019 | Nicolaescu | G01S 7/4817 |

* cited by examiner

PHOTONIC APPARATUS USING A PHASE ALIGNMENT WAVEGUIDE

TECHNICAL FIELD

The subject matter described herein relates in general to a silicon photonic device and, more particularly, to a photonic device that implements a phase alignment waveguide (e.g., star coupler) for transmitting and/or receiving optical signals.

BACKGROUND

Environmental perception can be a challenge for electronic devices. For example, electronic devices that operate autonomously such as robots and vehicles generally use one or more sensors to perceive a surrounding environment so that the devices can determine a location within the environment and map objects and obstacles. In this way, the autonomous electronic devices can determine paths through the environment when autonomously navigating and/or provide assistance to an operator in order to avoid objects or otherwise map the environment. However, sensors such as light/laser detection and ranging (LIDAR/LADAR) sensors can be cumbersome due to large sizes/weights associated with such devices and moving parts that, for example, rotate in order to provide a wide scanning field. Moreover, complex control systems associated with arrays of phase shifters can add to the complexity of control logic and, thus, also affect costs through increased chip area and difficulties associated with implementing such complex systems.

SUMMARY

An example of a photonic apparatus that is configured with one or more phase alignment waveguides is presented herein. In one embodiment, a phase alignment waveguide is implemented on a transmit side of the photonic apparatus such that the phase alignment waveguide provides for passively phase shifting a light wave. That is, the phase alignment waveguide is implemented as a phase aligner or a phase tuner and generally functions to accept a light wave and generate a plurality of light waves therefrom that have different phases respectively. In one embodiment, the phase alignment waveguide is a star coupler. The plurality of light waves are provided at outputs of the phase alignment waveguide and are either emitted from the photonic apparatus to form a beam of light or are provided to a further optical component (e.g., phase shifter) for further processing prior to being emitted. Moreover, the phase alignment waveguide is configured with multiple inputs that can separately provide the light wave into the phase alignment waveguide. The separate inputs are each associated with output light waves that have different phase profiles since the separate inputs are positioned in different locations on the phase alignment waveguide that cause the light wave to propagate along different paths to reach the outputs.

Accordingly, in one embodiment, the inputs to the phase alignment waveguide are separately activated by control circuitry or another mechanism such that the inputs are independently and dynamically activated to generate light waves at the outputs that have different phase profiles (e.g., different arrangements of phases). In this way, the phase alignment waveguide implemented as a star coupler provides for passive phase shifting of the light wave using a single monolithic device. Accordingly, implementing the star coupler in place of, for example, an array of phase shifters provides for generating phase changes of more than $2\pi$ radians at the outputs of the star coupler while reducing complexity of the photonic apparatus.

Additionally, or alternatively, in one embodiment, the photonic apparatus includes a phase alignment waveguide (e.g., star coupler) implemented within a receive side of the photonic apparatus. That is, the photonic apparatus includes a phase alignment waveguide that receives reflected light waves from an environment surrounding the photonic apparatus. In one example, the reflected light waves are waves (e.g., a beam of light) previously emitted by the transmit side to scan the environment. In either case, the star coupler can be implemented along with a lens to route the light waves into the photonic apparatus. That is, because of a general geometry of the star coupler light waves from a wide field of view can be simultaneously directed into the photonic apparatus using the star coupler and integrated lens. Thus, the reflected light waves can be simultaneously provided to an array of photodetectors or selectively provided to another component. In either case, the star coupler provides for reducing complexity of receiving components while improving an ability to simultaneously receive light waves from a wide field. In this way, a star coupler can be implemented in one or more aspects of the photonic apparatus to replace the noted array and/or other components and thereby improve control complexity and associated costs.

In one embodiment, a photonic apparatus is disclosed. The photonic apparatus includes a phase alignment waveguide including waveguide inputs and waveguide outputs. The waveguide inputs being operably connected with a light source to provide a light wave into the phase alignment waveguide and the waveguide outputs providing a plurality of light waves from the phase alignment waveguide. The phase alignment waveguide modulates the light wave to generate the plurality of light waves with different phases. The photonic apparatus includes a transmit switch operably connected with the waveguide inputs to selectively connect at least one of the waveguide inputs with the light source to provide the light wave into the optical waveguide. The photonic apparatus includes control circuitry operably connected with the transmit switch, the control circuitry dynamically activating the at least one of the waveguide inputs according to an electronic control signal.

In one embodiment, a photonic apparatus is disclosed. The photonic apparatus includes a lens exposed within a surface of the photonic apparatus to receive reflected waves from an external environment of the photonic apparatus. The photonic apparatus includes a receiving waveguide operably connected with the lens. The receiving waveguide includes receiving outputs located at defined positions along an opposing surface of the receiving waveguide that oppose the lens. The receiving outputs providing the reflected waves into the photonic apparatus. The receiving outputs receive the reflected waves according to associated angles of incidence of respective ones of the reflected waves with the lens. The photonic apparatus includes an optical component operably connected with the receiving outputs to receive the reflected waves.

In one embodiment, a light detection and ranging (LIDAR) apparatus is disclosed. The LIDAR apparatus includes a transmission component. The transmission component includes a transmitting waveguide including transmitting inputs and transmitting outputs. The transmitting inputs being operably connected with a light source to provide a light wave into the transmitting waveguide and the transmitting outputs providing a plurality of light waves from the transmitting waveguide. The optical waveguide modulates the light wave to generate the plurality of light waves with different phases. The photonic apparatus includes a receive component. The receive component includes a lens exposed within a surface of the photonic apparatus to receive reflected waves from an external environment of the photonic apparatus. The receive component includes a receiving waveguide operably connected with the lens. The receiving waveguide including receiving outputs located at defined positions along an opposing surface of the receiving waveguide that opposes the lens. The receiving outputs providing the reflected waves into the photonic apparatus.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
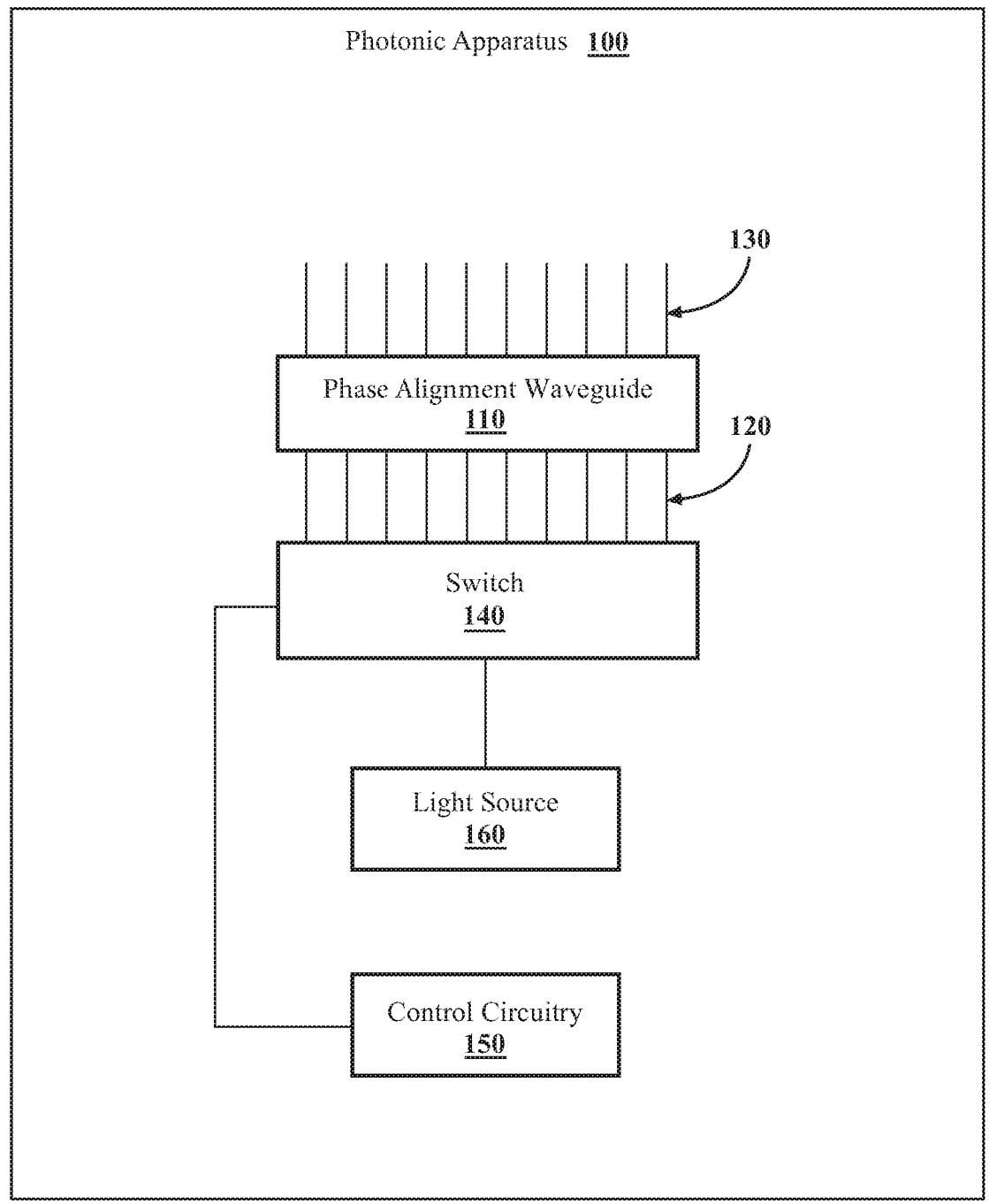
FIG. 1 is a block diagram illustrating one embodiment of a photonic apparatus that includes a phase alignment waveguide implemented using a star coupler.

Systems, methods and other embodiments associated with a photonic apparatus implementing one or more phase alignment waveguides are disclosed herein. As previously noted, devices such as LIDAR sensors can include arrays of discrete phase shifters that separately modulate a light wave to produce light waves with distinct phases. However, implementing arrays of phase shifters can be complex and, thus, can contribute to increased use of chip area. Additionally, implementing discrete phase shifters that provide a full $2\pi$ radians of phase shift can further complicate phase shifter design along with control complexities that also add to overall chip area. Accordingly, implementing arrays of discrete phase shifters can be costly. Moreover, receive side components can also include separate arrays of optical components that use complex control structures.

Therefore, in one embodiment, a photonic apparatus includes one or more phase alignment waveguides, which may be implemented as star couplers, that replace arrays of phase shifters and/or improve a manner of receiving light waves. As discussed herein, a star coupler can be implemented on a transmit side of a photonic apparatus, a receive side of a photonic apparatus, or on both the transmit and receive sides. For example, a star coupler can be provided for passively aligning phases of a light wave on the transmit side that have been diffracted within the star coupler. That is, the star coupler is implemented as a phase aligner or a phase tuner and generally functions to accept a light wave and generate a plurality of light waves therefrom that have different phases respectively and also in comparison to a source light wave. The star coupler is configured with multiple inputs that can separately provide the light wave into an optical waveguide that forms the star coupler. The separate inputs are each associated with output light waves that have different phase profiles since the separate inputs are positioned in different locations on the star coupler that results in the light wave being diffracted and propagating along different paths to reach the outputs.

Consequently, the plurality of light waves are provided at outputs of the star coupler with distinct phases in relation to the source light wave and in relation to one another. Moreover, the outputs either emit the plurality of light waves from the photonic apparatus to form a beam of light or provide the light waves to a further optical component (e.g., phase tuner/shifter) for further processing prior to being emitted. Thus, in one embodiment, the inputs to the star coupler are separately provided with the light wave via an optical switch or other mechanism. Accordingly, the outputs can be dynamically switched to have different phase profiles (e.g., different arrangements of phases) through control of the inputs. In this way, the star coupler provides for passive phase shifting of the light wave using a single monolithic device.

Additionally, or alternatively, in one embodiment, the photonic apparatus includes a star coupler implemented within a receive side. That is, the photonic apparatus includes a star coupler that receives reflected light waves from an environment surrounding the photonic apparatus. In one example, the reflected light waves are previously emitted waves transmitted to scan the environment. Because a general geometry of the star coupler simultaneously directs light from a wide field, the star coupler can be combined with a lens to route the light waves into the photonic device. In this way, the star coupler provides for reducing the complexity of receiving components while improving an ability to simultaneously receive light waves from a wide field. Therefore, a star coupler can be implemented in one or more aspects of the photonic apparatus to improve various aspects such as control complexity and associated costs.

Referring to FIG. 1, an example of a photonic apparatus 100 is illustrated. As an initial matter, while the photonic apparatus 100 is generally discussed as being included within a LIDAR, the disclosed photonic apparatus can, in further aspects, also be implemented in other optical systems as, for example, a replacement of an array of phase shifters. Thus, the embodiments disclosed herein are not limited to LIDAR sensors. Moreover, the disclosed photonic apparatus 100 is generally discussed as being implemented along with electronic devices such as robots, vehicles, and so on; however, it should be appreciated that the disclosed devices, systems, and methods can be integrated with the noted devices or can be provided as standalone components. Additionally, as used herein, a "vehicle" is any form of motorized transport. In one or more implementations, a vehicle refers to an automobile. While arrangements will be described herein with respect to automobiles, it will be understood that embodiments are not limited to automobiles. In some implementations, the vehicle may be any other form of motorized transport that, for example, benefits from data provided via the photonic apparatus 100.

As an additional note, the photonic apparatus 100 also includes various elements. It will be understood that in various embodiments it may not be necessary for the photonic apparatus 100 to have all of the elements shown in FIG. 1. The photonic apparatus 100 can have any combination of the various elements shown in FIG. 1. Further, the photonic apparatus 100 can have additional elements to those shown in FIG. 1. In some arrangements, the photonic apparatus 100 may be implemented without one or more of the elements shown in FIG. 1. Further, while the various elements are shown as being located within the photonic apparatus 100 in FIG. 1, it will be understood that one or more of these elements can be located external to the photonic apparatus 100. Further, the elements shown may be physically separated by varying distances.

Some of the possible elements of the photonic apparatus 100 are shown in FIG. 1 and will be described along with subsequent figures. However, for purposes of brevity of this description, some elements that may be included within the photonic apparatus 100 have been omitted from FIG. 1 and the associated discussion. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the photonic apparatus 100 includes a phase alignment waveguide 110 (also referred to as a transmitting waveguide herein) that is an optical waveguide implemented, in one embodiment, as a star coupler. The star coupler is, for example, implemented as a Rotman lens or in another configuration. The phase alignment waveguide 110 can be composed of $SiO_2$, SiN, or another suitable material. In general, the phase alignment waveguide 110 modulates a light wave propagating therein by changing a phase of the light wave as provided at the outputs 130. Moreover, the phase alignment waveguide 110 diffracts or otherwise splits a light wave received on one of the waveguide inputs 120 such that the separate outputs 130 each provide a transformed version of the light wave with a distinct phase. That is, because paths between the inputs 120 and the outputs 130 are different (i.e., of a different length), when provided at the outputs 130, the light wave has shifted in phase relative to an original form provided at the input and relative to additional forms of the light wave provided at other ones of the outputs 130.

Furthermore, the waveguide inputs 120 and the waveguide outputs 130 are positioned at defined locations on the phase alignment waveguide 110. For example, in one embodiment, the waveguide inputs 120 and the waveguide outputs 130 are positioned at defined locations on the phase alignment waveguide 110. In general, the waveguide outputs 130 are positioned such that a phase offset or difference between phases of light waves provided on adjacent ones of the outputs 130 conforms to a phase pattern/profile.

For example, the phase difference between a first one of the waveguide outputs 130 and a second one of the waveguide outputs 130 is, for example, $\delta_1$. Accordingly, the phase differences continue between outputs of subsequent ones of the waveguide outputs 130 such that a phase difference between the second waveguide output 130 and a third waveguide output is $\delta_3$, a phase difference between the third waveguide output and the fourth waveguide output is $\delta_3$ (e.g., $\delta_1$), and so on. Moreover, it should be appreciated that, in general, phase differences between adjacent outputs 130 are regular and thus phase differences with relation to the first optical output are multiples thereof (e.g. $2\delta_1$, $3\delta_1$, etc.).

Additionally, the waveguide outputs 130 can be arranged in different configurations; however, as discussed herein, the waveguide outputs 130 are arranged at defined spacings/locations that are generally regular. The defined locations generally refer to a spacing of the optical outputs on the phase alignment waveguide 110 and in relation to the waveguide inputs 120. That is, because the paths between the waveguide inputs 120 and the waveguide outputs 130 dictate the phase change induced in a light wave, placing the waveguide outputs 130 at defined locations that are generally regular spacing provides for coupling the light waves with regular differences in the respective phases. For example, the regular spacing can produce distinct phases at each of the optical outputs that are offset by 30 degrees, 45 degrees, 90 degrees, or another regular amount of phase shift that is determined according to, for example, particular aspects of the implementation.

Furthermore, while the positioning of the waveguide outputs 130 has generally been discussed as a factor affecting phase differences between respective ones of the waveguide outputs 130, the positioning of the waveguide inputs 120 on the phase alignment waveguide 110 can also affect the phases of the light waves provided form the waveguide outputs 130. That is, because the paths from a given one of the waveguide inputs 120 to the waveguide outputs 130 is what induces the phase changes observed at the waveguide outputs 130, the waveguide inputs 120 are, in one embodiment, also positioned at particular locations and spacing on the phase alignment waveguide 110 such that the phases of the light wave produced at the waveguide outputs 130 conform to particular phase profiles. Thus, the spacing of the waveguide inputs 120 can be provided at regular intervals across the phase alignment waveguide 110 to facilitate providing a particular pattern/profile at the outputs 130.

As an additional note, while the phase alignment waveguide 110 is discussed as modulating a phase of the light wave by routing the light wave via various paths internal to the phase alignment waveguide 110, in one embodiment, various characteristics of the phase alignment waveguide 110 are actively controlled by control circuitry 150. For example, the phase alignment waveguide 110 may be tuned to provide a particular phase change using thermo-optic controls and/or electro-optic controls.

The control circuitry 150 functions to control a heater (not illustrated) to produce a particular amount of thermal energy, and provide the thermal energy to the phase alignment waveguide 110. That is, because an amount of phase shift induced within the light wave can be controlled as a function of a present temperature, the control circuitry 150 controls the heater to provide thermal energy according to an amount of phase change that is desired. Furthermore, in additional aspects, the phase alignment waveguide 110 can be controlled to adjust the phase change using an electro-optic control. Thus, in a similar manner, the control circuitry 150 can control the electro-optic control to adjust the phase change within the phase alignment waveguide 110.

Moreover, because providing a light wave at a single one of the waveguide inputs 120 produces light waves at all of the waveguide outputs 130, the phase alignment waveguide 110 generally uses a single one of the waveguide inputs 120 at a given time. For example, with further reference to FIG. 1, the photonic apparatus 100 is illustrated as including a switch 140. In one embodiment, the switch 140 is an optical switch or other mechanism that selectively provides a light wave to at least one of the waveguide inputs 120. Accordingly, control circuitry 150 generally functions to control the switch 140 to provide a light wave from a light source 160 to one of the waveguide inputs 120. The control circuitry 150 can select one of the waveguide inputs 120 according to a particular profile of phases that is desired at the waveguide outputs 130. That is, depending on a particular direction in which a beam of light is to be emitted, the control circuitry 150 selects one of the waveguide inputs 120 that causes a desired phase profile to be produced at the waveguide outputs 130. Accordingly, by varying which of the waveguide inputs 120 is provided with the light wave by the switch 140, a different phase profile can be generated at the waveguide outputs 130 and, thus, the beam of light can be directed in varying directions.

In general, the phase alignment waveguide 110 receives the noted light wave from a light source 160. The light source 160 is a laser or other light source used with silicon photonic devices. Accordingly, a wavelength and other characteristics of the light wave from the light source 160 can be controlled either dynamically or as a particular aspect of implementation. As a further matter, it should be noted that reference to light waves, waves, optical signals, and light all generally refer to electromagnetic radiation having a particular wavelength. For example, as discussed herein the light wave is infrared light (e.g., 1550 nm) or a similar wavelength. In further aspects, the particular wavelength of light may be varied according to particular aspects of the implementation. Moreover, the light source 160 generally produces the light wave with a particular phase.

In either case, the phase alignment waveguide 110 receives the light wave from the light source 160 at one of the waveguide inputs 120. As previously mentioned, the waveguide outputs 130 are generally arranged at regular intervals on the phase alignment waveguide 110 in order to provide the light wave with distinct phases that are related in a particular pattern or phase profile (e.g., arrangement of phases or different phase front alignments). In further implementations, the waveguide outputs 130 can be placed at irregular intervals or in locations on the phase alignment waveguide 110 that are selected to provide for coupling the light wave from the phase alignment waveguide 110 at whichever arrangement of phases that is desired.

The particular configuration of the waveguide inputs 120 and the waveguide outputs 130 is generally customizable according to aspects of the implementation, and, thus, should not be construed as being limited to a particular configuration in regards to placement about the phase alignment waveguide 110. However, for purposes of this discussion the waveguide outputs 130 and the waveguide inputs 120 are generally discussed as being placed at defined regular intervals on the phase alignment waveguide 110.

Additionally, it should be noted that the photonic apparatus 100 is a chip-scale silicon photonic device. In one embodiment, the photonic apparatus 100 is further integrated with CMOS integrated circuit devices (e.g., control circuitry 150) to provide additional functionality. In either case, the discussed waveguides, such as the phase alignment waveguide 110, the waveguide inputs 120, the waveguide outputs 130, and so on are structures that are transparent to a wavelength of light carried therein. Moreover, the discussed operable connections are, in one embodiment, couplings between two or more waveguides or other photonic components.

Figure 2:
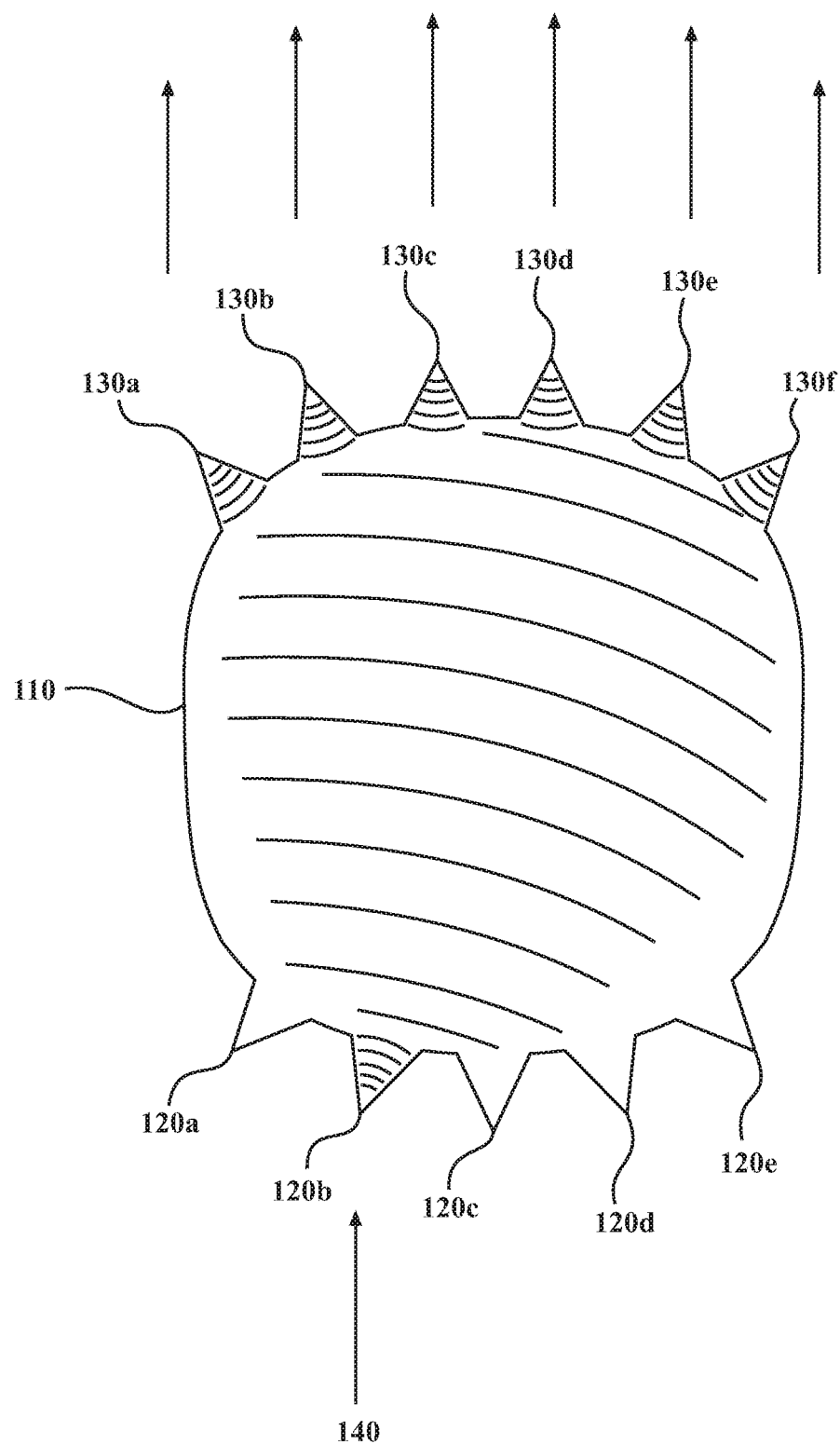
FIG. 2 is a diagram illustrating one embodiment of a phase alignment waveguide including waveguide inputs and waveguide outputs.

As further explanation, consider FIG. 2 and a general configuration of the phase alignment waveguide 110. As illustrated in FIG. 2, the phase alignment waveguide 110 includes waveguide outputs 130a, 130b, 130c, 130d, 130e, and 130f coupled with the phase alignment waveguide 110. Moreover, the phase alignment waveguide 110 is further illustrated with waveguide inputs 120a, 120b, 120c, 120d, and 120e. Of course, the phase alignment waveguide 110 is illustrated with multiple waveguide inputs 120 and outputs 130 for purposes of illustration and can include a different number (e.g., hundreds or thousands) of inputs/outputs in various implementations. As illustrated in FIG. 2, the phase alignment waveguide 110 is a star coupler which is implemented using a Rotman lens. Thus, the phase alignment waveguide 110, in one aspect, acts as an antenna structure in addition to providing passive phase shifting functionality.

For example, as illustrated in FIG. 2, the phase alignment waveguide 110 receives a light wave on waveguide input 120b. The light wave is represented by the hashed lines within phase alignment waveguide 110 that propagate from the input 120b through the waveguide 110 and out the outputs 130 as separate light waves with different phases. In one embodiment, the separate lights wave are emitted from the phase alignment waveguide 110 and from the photonic apparatus 100 as a result. Consequently, the light waves then merge in superposition to form a beam of light provided in a particular direction as a function of the phases.

Figure 3:
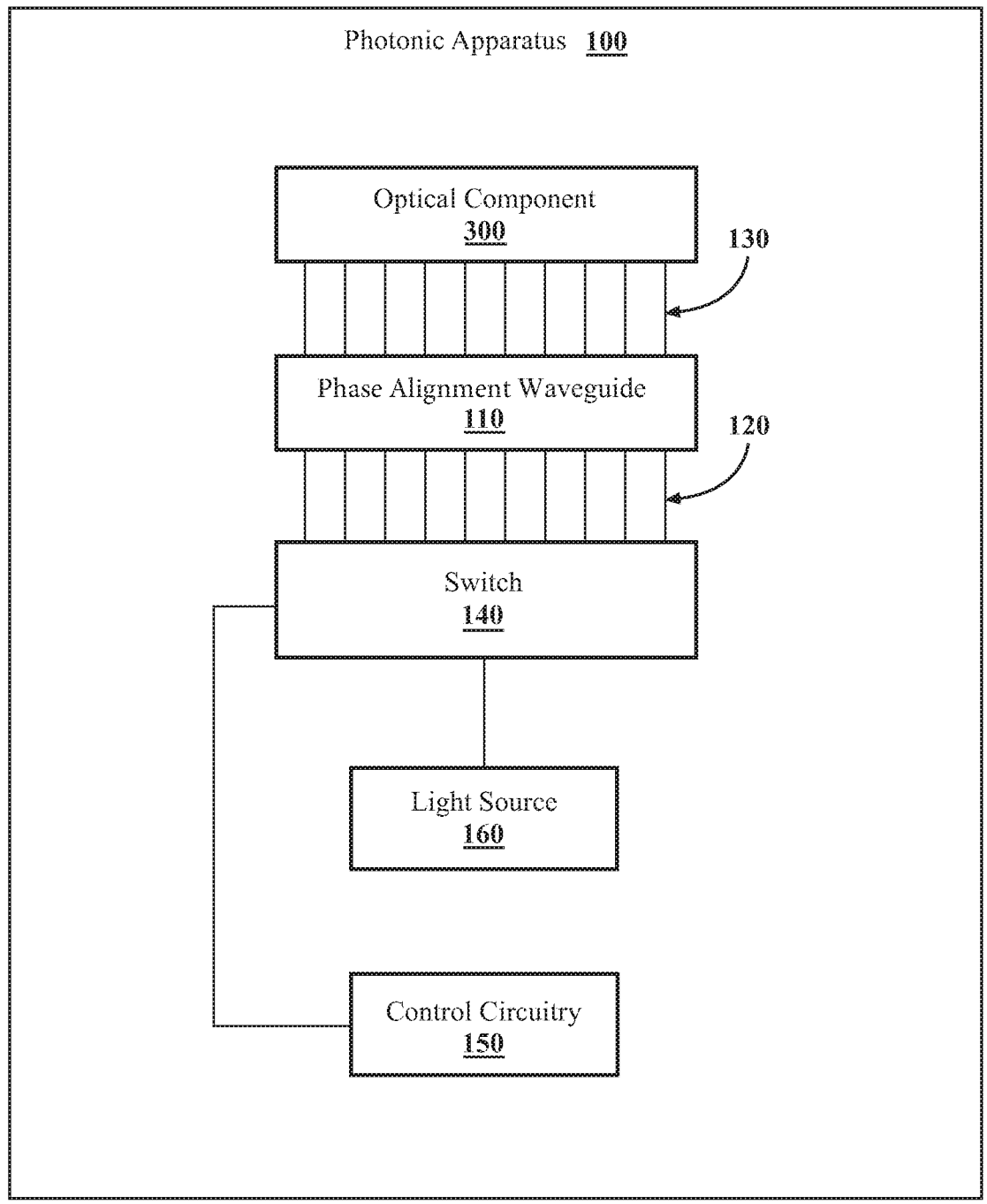
FIG. 3 is a block diagram illustrating one embodiment of a photonic apparatus that includes a phase alignment waveguide connected to an optical component.

With reference to FIG. 3, one embodiment of the photonic apparatus 100 of FIG. 1 is further illustrated. As shown in FIG. 3, the waveguide outputs 130 are operably connected with an optical component 300. Thus, instead of emitting the light waves directly from the phase alignment waveguide 110, as shown in FIG. 3, the light waves are provided into the optical component 300. The optical component 300 is, for example, an antenna structure, an array of phase shifters, an optical grating, and so on. Thus, while the phase alignment waveguide 110 is generally discussed as shifting a phase of the light wave, in one embodiment, the phase alignment waveguide 110 provides a partial phase shift to the light waves in order to, for example, reduce implementation requirements for an array of phase shifters (e.g., the optical component 300). That is, if the phase alignment waveguide 110 is provided to perform a certain extent of the desired phase shift, then the optical component 300 need not phase shift the light wave to the full desired extent and can thus be implemented in a manner that, for example, uses less chip area and is generally less complex. In this way, the control complexity of the photonic apparatus 100 can be improved.

Figure 4:
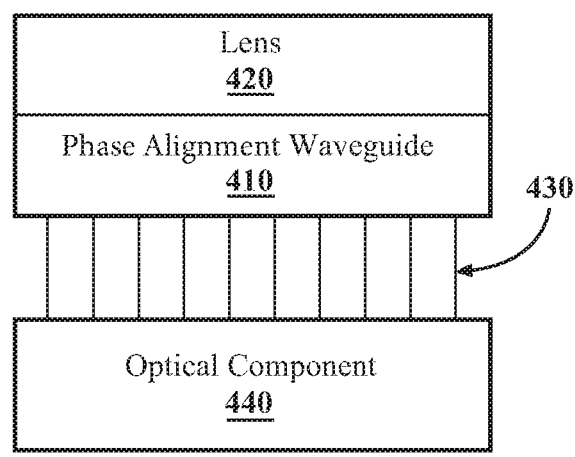
FIG. 4 is a diagram illustrating one embodiment of a photonic apparatus including receive side components comprised of a lens and an optical waveguide.

With reference to FIG. 4, one example of a receive side of a photonic apparatus 400 is illustrated. As an initial note, while the photonic apparatus 400 is discussed as being separate from the photonic apparatus 100, in general, the photonic apparatus 100 can be integrated with the photonic device 400 as separate transmit and receive sides of a LIDAR sensor. Moreover, in further aspects, the photonic apparatus 100 and the photonic apparatus 400 may be separately implemented without specific aspects of the other respective photonic apparatus. In either case, the photonic apparatus 400 retains the same general context as previously discussed in relation to the photonic apparatus 100.

Accordingly, in a similar manner as the photonic apparatus 100, the photonic apparatus 400 is generally discussed as being included within a LIDAR, the disclosed photonic apparatus can, in further aspects, also be implemented in other optical systems as, for example, a receiving antenna structure. Thus, the embodiments disclosed herein are not limited to LIDAR sensors. Moreover, the disclosed photonic apparatus 400 is generally discussed as being implemented along with electronic devices such as robots, vehicles, and so on. As an additional note, the photonic apparatus 400 also includes various elements. The photonic apparatus 400 can have various combinations of the noted elements shown in FIG. 4 and may also include additional elements that are not illustrated.

As illustrated, the photonic apparatus 400 includes an phase alignment waveguide 410 (also referred to as a receiving waveguide herein) that is, for example, a star coupler. In one embodiment, the phase alignment waveguide 410 is a star coupler implemented using a Rotman lens. Additionally, the phase alignment waveguide 410 is integrated with a lens 420. The lens 420, in one embodiment, is exposed within a surface of the photonic apparatus 400 to capture light waves from an external environment. The lens 420 can be concave or convex and can also have a particular geometry (e.g., hemispherical, cuboid, polyhedral, etc.) that facilitates capturing light waves.

As the photonic apparatus 400 is, in one example, a receive side of a LIDAR device, the lens 420 captures reflected light waves and provides the reflected waves of light into the phase alignment waveguide 410. As such, the reflected light waves originate from, for example, the photonic apparatus 100 emitting a beam of light using the phase alignment waveguide 110. In either case, the lens 420 is operably connected with the phase alignment waveguide 410 across a bottom surface of the lens 420 and a top surface of the phase alignment waveguide 410 such that the lens 420 is coextensive with the phase alignment waveguide 410 within an area where the two components meet.

Accordingly, the lens 420 in combination with the phase alignment waveguide 410 function to capture the reflected light waves from a wide field of view. That is, the lens 420 directs light waves into the phase alignment waveguide 410 from an external environment. In general, the lens 420 directs light waves into the phase alignment waveguide 410 according to an angle of incidence of the light waves on the lens 420. That is, according to an angle at which the respective light waves encounter the lens 420, the lens 420 will provide the respective light waves into the optical waveguide 420 as a function of the angle. In general, the angle is related to bearing/direction within the surrounding environment from which the light wave is reflected. Thus, the lens 420 provides for capturing reflected waves from a wide field within the surrounding environment.

Moreover, because the lens 420 directs the reflected light waves according to an associated bearing/angle, an arrangement of the receiving outputs 430 on the phase alignment waveguide 410 is selected to convey the reflected waves. That is, the receiving outputs 430 are positioned on the optical waveguide to correlate with receiving the reflected waves across the noted wide field or, in other words, the wide range of possible bearings from which lights waves may be received. The wide field may be thought of as a range of angles in relation to the lens 420 that the photonic apparatus 400 can receive light waves. Thus, the field is, in essence, a field of view of the photonic apparatus 400. The field of view is, in one embodiment, 180 degrees, 165 degrees or another suitable field of view.

In either case, the receiving outputs 430 are positioned about the phase alignment waveguide 410 such that the reflected waves directed into the phase alignment waveguide 410 by the lens 420 are provided to one of the outputs 430. That is, the outputs 430 are placed in order to accept the reflected waves from across the field view. Thus, in one embodiment, the outputs 430 are regularly spaced across the phase alignment waveguide 410 such that at least one of the outputs 430 correlates with each degree across the field of view. Moreover, in further implementations, a resolution of outputs 430 may be every fraction of a degree (e.g., every 0.5 degrees, 0.25 degrees, etc.) such that the outputs 430 sufficiently capture the reflected waves. Accordingly, the photonic apparatus 400 can include a number of outputs 430 that correlate with a width of the field of view and a resolution within the field. Thus, in one example, the phase alignment waveguide 410 includes 180, 360, 720 or more of the outputs 430.

The receiving waveguides 430 provide the reflected waves to an optical component 440. The optical component 440 is, in one embodiment, a switched photodetector or an array of photodetectors that sense the reflected light waves and, for example, convert the reflected light waves into electrical signals for processing by an analog-to-digital converter or other processing element. Alternatively, or additionally, the optical component 440 is an interferometer or other optical component. In either case, the configuration of the phase alignment waveguide 410 with the lens 420 provides for simultaneously providing lights waves from different bearings within the external environment to the optical component 440. Thus, the photonic apparatus 400 permits receiving reflected waves across a wide field simultaneously and, therefore, providing a more robust receiving mechanism. That is, the phase alignment waveguide 410 passively and simultaneously routes a plurality of reflected light waves in order to capture information about the external environment in a succinct manner while improving control complexity of a receive side of, for example, a LIDAR device.

Figure 5:
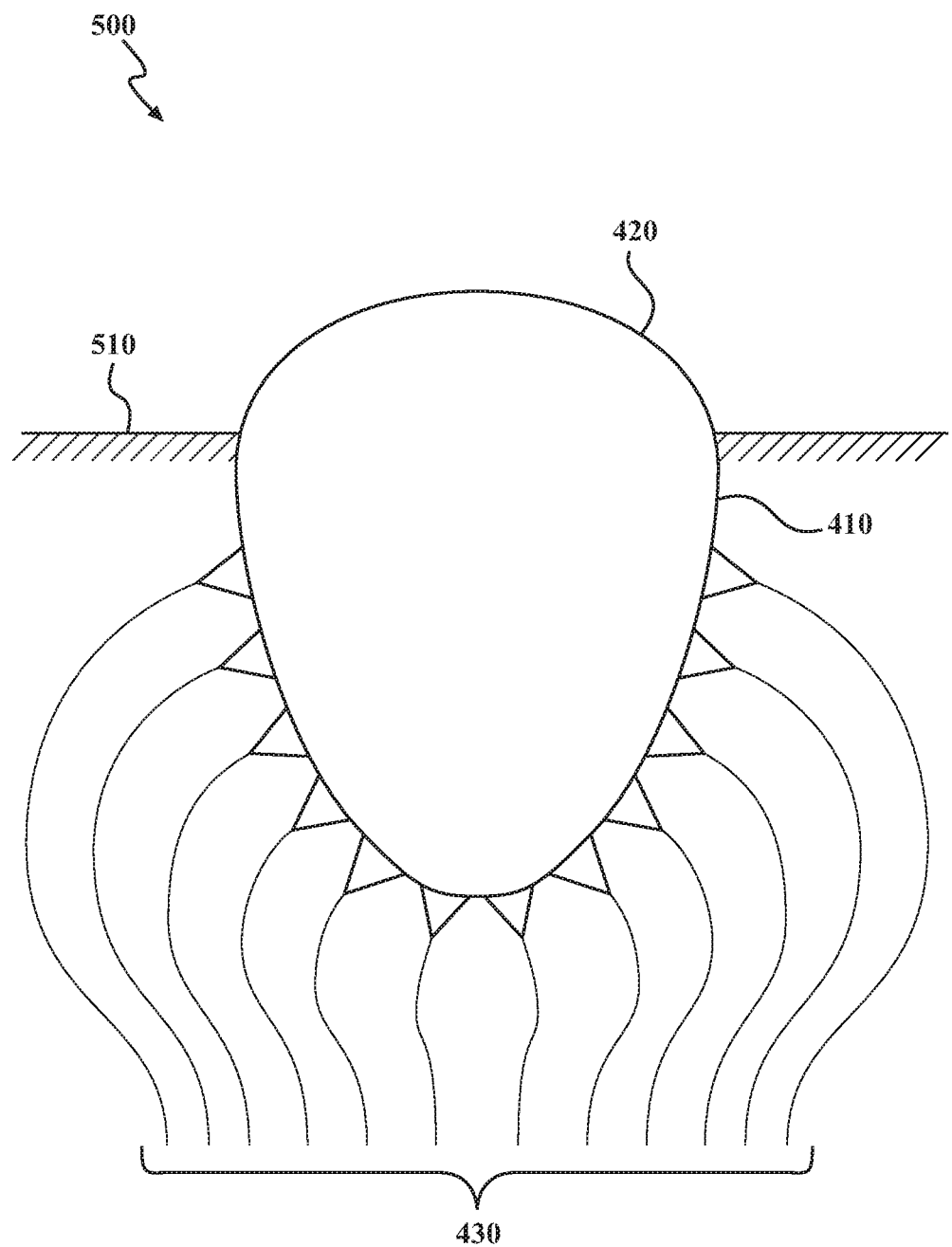
FIG. 5 illustrates one example of a lens and star coupler of a photonic apparatus.

With reference to FIG. 5, a cross-section 500 of one example implementation of the lens 420, the phase alignment waveguide 410, and the receiving outputs 430 is illustrated. As shown, the lens 420 has a convex hemispherical geometry and extends above a surface 510 of the photonic apparatus 400. A bottom surface of the lens 420 is operably connected with an upper surface of the phase alignment waveguide 410. The phase alignment waveguide 410 is illustrated in a star coupler configuration that accepts inputs as the reflected waves from the lens 420 at the upper surface which is generally coextensive with the surface 510. The reflected light waves propagate through the phase alignment waveguide 410 according to a particular angle from which the reflected light waves are received and are coupled out of the phase alignment waveguide 410 via the receiving outputs 430. As previously noted the receiving outputs 430 are positioned on the phase alignment waveguide 410 to individually accept light waves from associated bearings. That is, respective ones of the reeving outputs 430 are located in order to correlate with respective angles from which the reflected waves may be received. In this way, the photonic apparatus 400 can simultaneously receive the reflected light waves across a wide field of view and provide the waves for processing.

Figure 6:
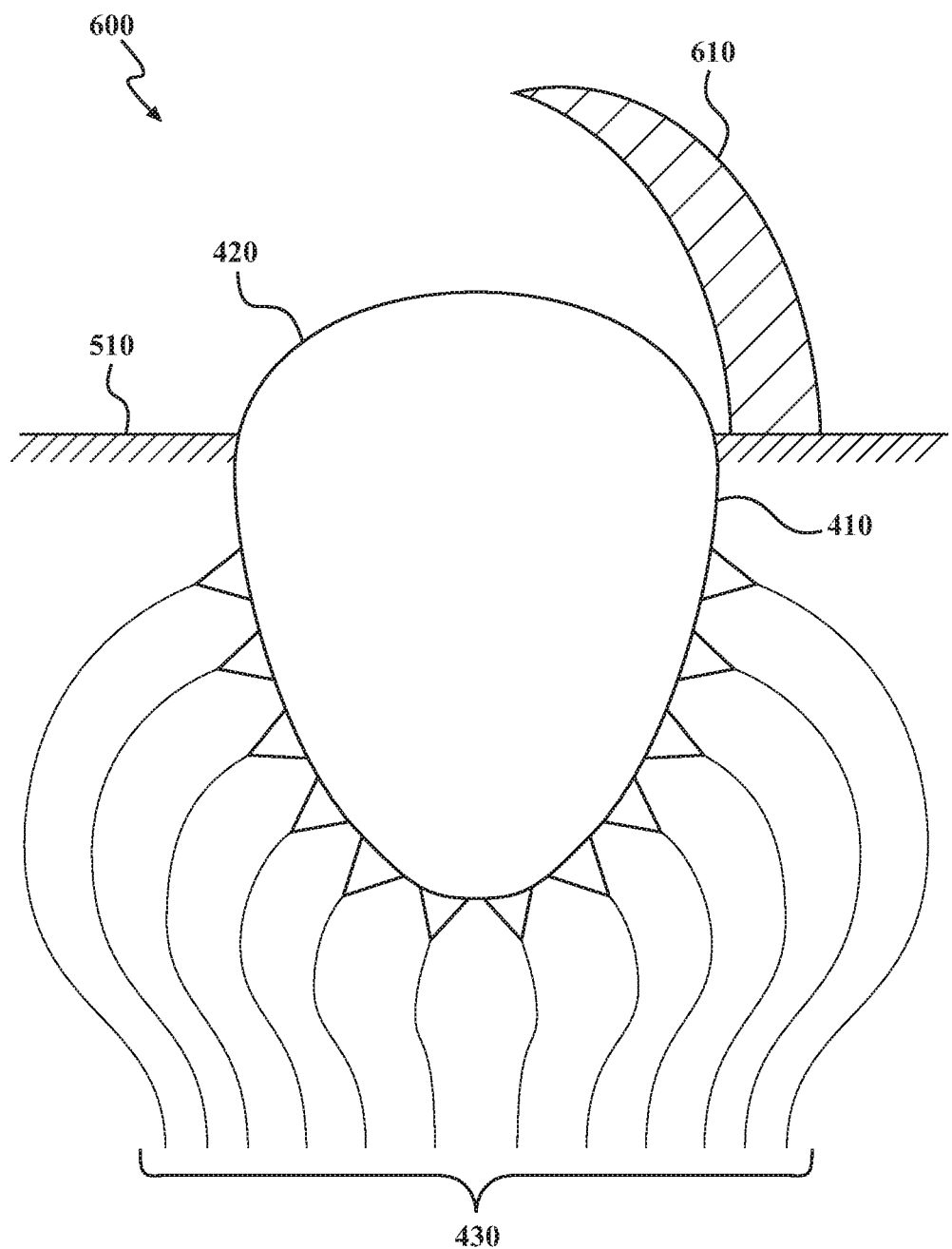
FIG. 6 illustrates a side view of a receive side star coupler with an integrated lens and mirror.

With reference to FIG. 6, a cross-section 600 of a further example of the photonic apparatus 400 is illustrated. The embodiment illustrated in FIG. 6 includes elements similar to those of FIG. 4 and FIG. 5 except that the cross-section 600 also includes a mirror 610. The mirror 610 is a reflective structure extending above the surface 510 that directs lights waves into the lens 420. In one aspect, the mirror 610 extends a field of view of the lens 420. Alternatively, the mirror 610 can be implemented to focus a view of the lens 420 within a specific region. Thus, the mirror 610 may have a parabolic geometry or another suitable geometry to suit the noted implementation.

Figure 7:
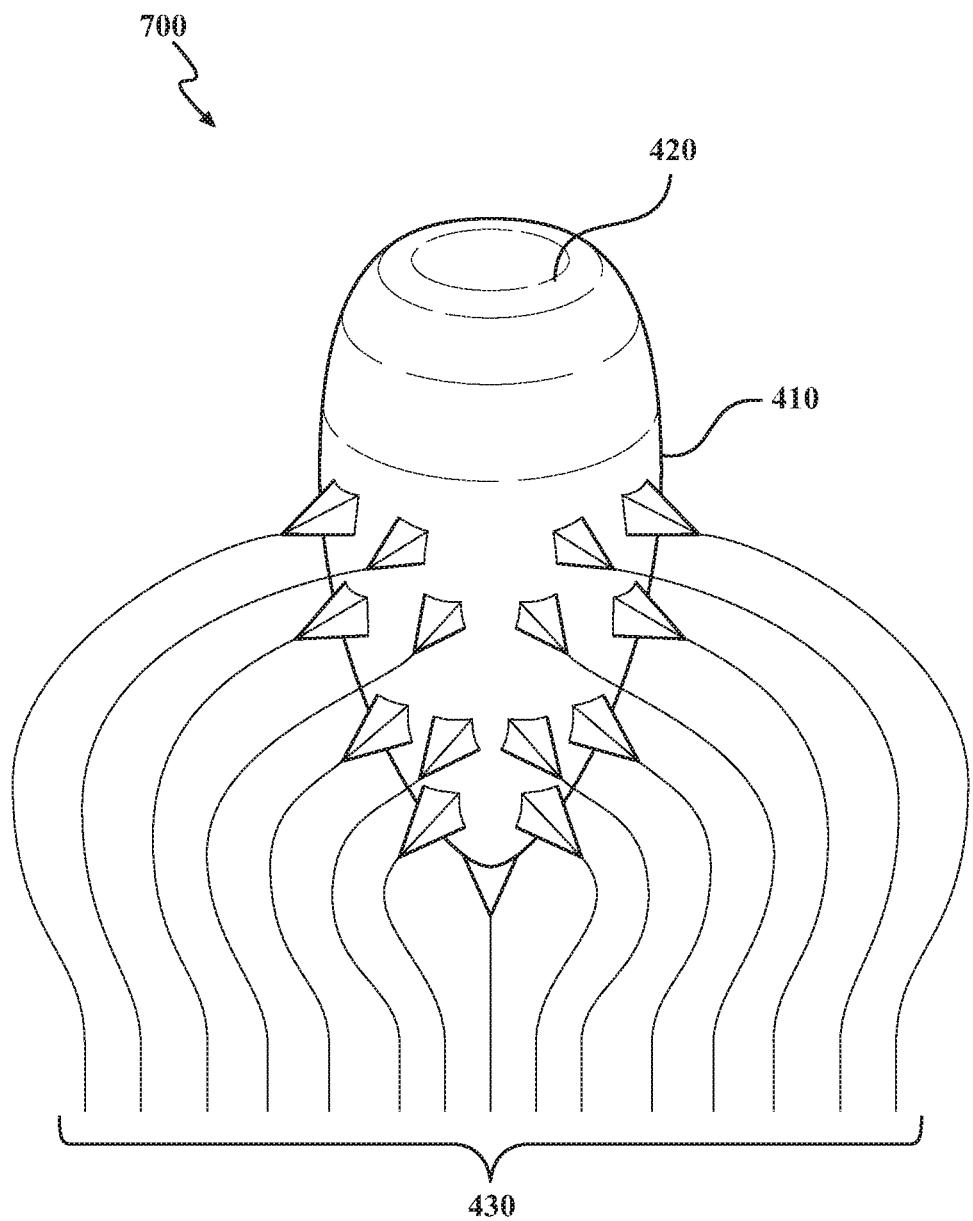
FIG. 7 illustrates a three-dimensional view of components from FIG. 5.

With reference to FIG. 7, a three-dimensional view 700 of the phase alignment waveguide 410, the lens 520, and the receiving outputs 430 is illustrated. It should be appreciated, that the components 410, 420, and 430 can be implemented in a substantially planar configuration such as that illustrated in FIGS. 4, 5, and 6. However, in further aspects, the components 410, 420, and 430 can also be implemented as a 3D form. For example, the phase alignment waveguide 410 as illustrated in FIG. 7 has a conical shape with outputs 430 located on a body of the waveguide 410 in 360 degrees around the waveguide 410 and also extending vertically up and down the waveguide 410. Thus, the embodiment of the elements 410, 420, and 430 illustrated in FIG. 7 provides a wider field of view relative to a planar 2D form since inputs to the lens, and the waveguide 410 can be captured in 3D space.

Figure 8:
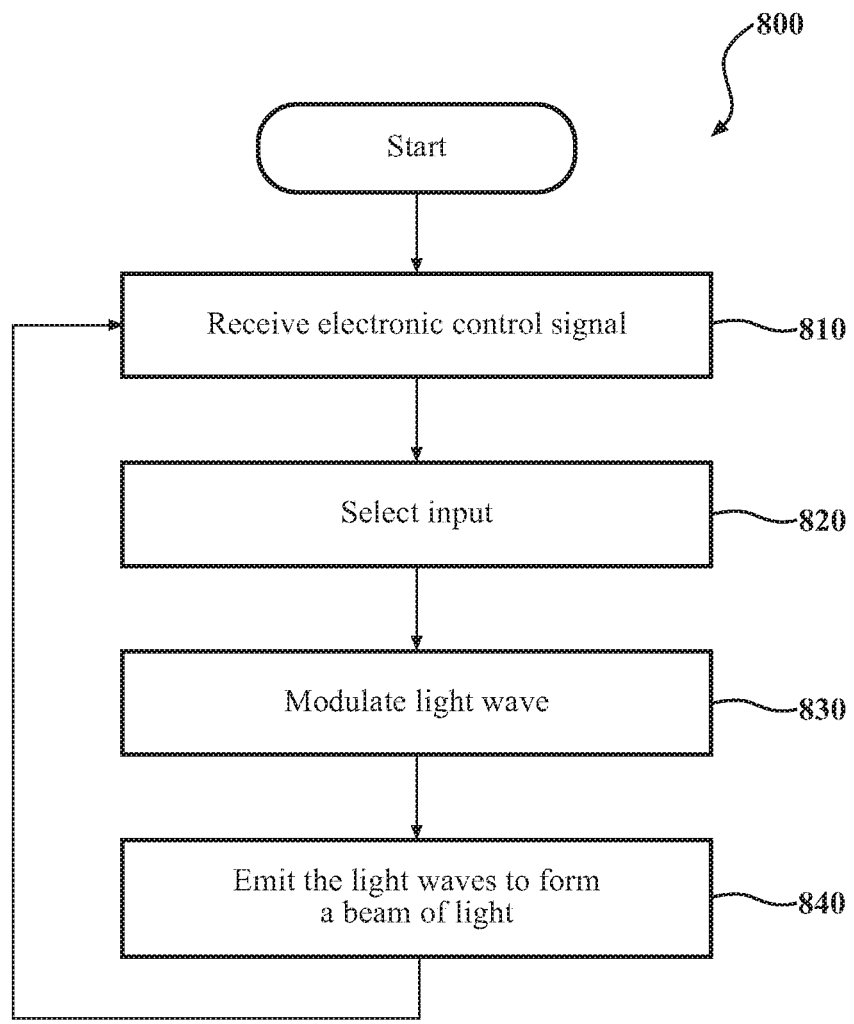
FIG. 8 is a flowchart illustrating one embodiment of a method associated with using a star coupler as a phase aligner.

Additional aspects of the photonic apparatus 100 and 400 will be discussed in relation to FIGS. 8 and 9, respectively. FIG. 8 illustrates a flowchart of a method 800 that is associated with using a star coupler to modulate a light wave. Method 800 will be discussed from the perspective of the photonic apparatus 100 of FIG. 1. While method 800 is discussed in combination with the photonic apparatus 100, it should be appreciated that the method 800 is not limited to being implemented within the photonic apparatus 100, but is instead one example of a system that may implement the method 800 and associated components.

At 810, an electronic control signal is received that indicates a phase profile to provide using the phase alignment waveguide 110. In one embodiment, the control circuitry 150 receives the electronic control signal from an autonomous driving module, or other electronic entity that processes and/or otherwise uses data produced by the photonic apparatus 100. For example, in one embodiment, the photonic apparatus 100 produces point cloud data about a surrounding environment of the photonic apparatus 100 that is used to detect objects, obstacles, and other aspects of the surrounding environment. The autonomous driving module can use the point cloud data to identify a path through the surrounding environment, identify hazards, track objects, and so on.

In either case, the autonomous driving module can produce the electronic control signal to request sensor data from the photonic apparatus 100 about a particular locality in the surrounding environment, and/or as an update to the sensor data. Alternatively, or additionally, in one embodiment, the electronic control signal is generated internally to the photonic apparatus 100 to cause the control circuitry 150 to regularly scan the surrounding environment in a sweeping and repetitive manner in order to continuously provide an updated view of the surrounding environment. Accordingly, the electronic control signal generally indicates a phase profile of multiple light waves that are to be emitted from the photonic apparatus 100 in order to control an emitted beam of light to have a particular direction relative to the photonic apparatus 100.

At 820, at least one of the waveguide inputs 120 to the phase alignment waveguide 110 are selected as a function of the phase profile that is to be provided. In one embodiment, the control circuitry 150 can control the switch 140 to connect the light source 160 with a particular one of the waveguide inputs 120 that will cause the outputs 130 to provide the desired phase pattern. Thus, the control circuitry 150 provides a control signal to the switch 140 in order to cause the switch 140 to provide a light wave to a selected one of the inputs 120. While the switch 140 is discussed as providing the light wave to a single one of the inputs 120, in further examples, the switch may connect two or more of the inputs with the light source 160 to obtain a desired phase profile from the outputs 130. In either case, the switch 140 dynamically switches between providing the light wave on different ones of the inputs 120 as indicated by the control circuitry 150.

At 830, a light wave that is received by and is propagating within the phase alignment waveguide 110 is modulated. In one embodiment, the phase alignment waveguide 110 modulates the light wave and generates the plurality of light waves therefrom by providing the light wave across multiple different pathways from the selected one of the inputs 120 to the outputs 130. That is, as previously discussed, the light wave is phase shifted as a function of following different paths through the phase alignment waveguide 110.

At 840, the photonic apparatus 100 emits the separate light waves provided via the optical outputs 130. As the light waves with the distinct phases according to the noted phase profile are emitted from the waveguide outputs 130, the light waves combine in super-position and are thus formed into the beam of light that is provided in a particular direction. In this way, the photonic apparatus 100 can control a direction of the beam of light.

As an additional note, while the blocks 810-840 are discussed in a serial manner, in various implementations, one or more of the blocks 810-850 execute in parallel. For example, blocks 810-830 may execute iteratively while block 840 executes iteratively in parallel such that the light waves provided from the outputs 130 are nearly continuously provided with changing phases in order to, for example, control the emitted beam of light to be directed in a sweeping or scanning motion.

Figure 9:
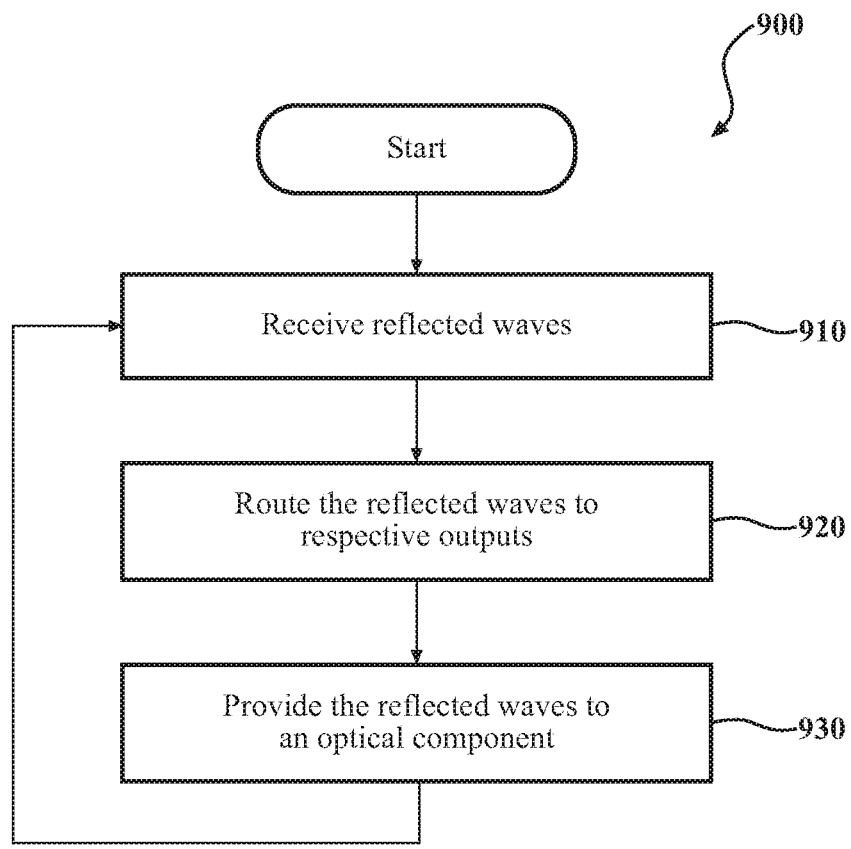
FIG. 9 is a flowchart illustrating one embodiment of a method associated with using a star coupler to receive reflected light waves.

FIG. 9 illustrates a flowchart of a method 900 that is associated with using a star coupler to simultaneously receive reflected light waves. Method 900 will be discussed from the perspective of the photonic apparatus 400 of FIG. 4. While method 900 is discussed in combination with the photonic apparatus 400, it should be appreciated that the method 900 is not limited to being implemented within the photonic apparatus 400, but is instead one example of a system that may implement the method 900 and associated components.

At 910, the lens 420 receives reflected waves and directs the reflected waves into the phase alignment waveguide 410. That is, as the light waves contact the lens 420, the lens 420 causes the light waves to bend into and thus towards the phase alignment waveguide 410 as a function of physical properties of the lens 420 (e.g., refractive index, lens geometry, etc.).

At 920, the optical waveguide 920 routes the reflected waves received from the lens 420 to associated ones of the outputs 430. In one embodiment, the outputs 430 are positioned at locations on the phase alignment waveguide 410 such that respective ones of the outputs 430 receive reflected waves from a particular bearing. Moreover, the outputs 430 are generally comprised of a transition that is formed within a surface of the optical waveguide 430 to couple light from the phase alignment waveguide 410 into the outputs 430. Thus, the transitions can be implemented using different configurations as may be appropriate for a particular implementation. However, in general, the transitions are cone shaped and extend from a surface of the phase alignment waveguide 410 and into the outputs 430 in order to guide the reflected light waves along the outputs 430 while minimizing attenuation.

At 930, the receiving waveguides 430 provide the reflected waves to an optical component (e.g., component 140). The optical component is generally a transducer or other component (e.g., photodiode) that converts the reflected light waves into electrical signals.

FIG. 1 will now be discussed in further detail as an example environment within which the system and methods disclosed herein may operate. The photonic apparatus 100 can include one or more processors. In one or more arrangements, the processor(s) can be a main processor of the photonic apparatus 100. For instance, the processor(s) can be an electronic control unit (ECU). The photonic apparatus 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the photonic apparatus 100 from transmitting the beam of light and receiving responses thereto. As will be explained below, the photonic apparatus 100 can be a part of a sensor system of a vehicle or other device. The sensor system can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors (e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the photonic apparatus 100 (including any of the elements shown in FIG. 1). The sensor system can acquire data of at least a portion of the external environment of the photonic apparatus 100 (e.g., nearby vehicles, obstacles).

As an example, in one or more arrangements, the sensor system can include one or more radar sensors, one or more LIDAR sensors, one or more sonar sensors, and/or one or more cameras. The processor(s), and/or the autonomous driving module(s) can be operably connected to communicate with the various vehicle systems and/or individual components thereof. For example, returning to the processor(s) and/or the autonomous driving module(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The photonic apparatus 100 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A photonic apparatus, comprising:
   a phase alignment waveguide including waveguide inputs and waveguide outputs, the waveguide inputs being operably connected with a light source to provide a light wave into the phase alignment waveguide via a subset of the waveguide inputs and the waveguide outputs providing a plurality of light waves from the phase alignment waveguide, wherein the phase alignment waveguide is a first star coupler that is a single structure that modulates the light wave to generate the plurality of light waves with different phases at the waveguide outputs according to one of the waveguide inputs that received the light wave;
   a transmit switch operably connected with the waveguide inputs to selectively connect at least one of the waveguide inputs with the light source to provide the light wave into the phase alignment waveguide to cause the waveguide outputs to provide the light wave according to a defined pattern of phases;
   control circuitry operably connected with the transmit switch, the control circuitry dynamically activating the at least one of the waveguide inputs according to an electronic control signal; and
   a receiving waveguide operably connected with a lens across a bottom surface of the lens and with receiving outputs located at defined positions along an opposing surface of the receiving waveguide that opposes the lens, the receiving outputs providing reflected waves into the photonic apparatus, wherein the receiving waveguide is a second star coupler that permits the photonic apparatus to simultaneously receive the reflected waves from multiple different bearings.

2. The photonic apparatus of claim 1, wherein the phase alignment waveguide diffracts the light wave as the light wave enters the at least one of the waveguide inputs, and wherein the phase alignment waveguide modulates a phase of the light wave according to a path through the phase alignment waveguide traveled by the light wave.

3. The photonic apparatus of claim 2, wherein respective ones of the waveguide outputs receive respective ones of the plurality of light waves that are formed from the phase alignment waveguide diffracting the light wave and the light wave thereby traveling different paths through the phase alignment waveguide, and
   wherein the phase alignment waveguide modulates the respective ones of the plurality of light waves to have different phase front alignments according to a respective one of the different paths.

4. The photonic apparatus of claim 1, wherein providing the light wave on different respective ones of the waveguide inputs produces the plurality of light waves at the waveguide outputs with the different phases according to which of the waveguide inputs provided the light wave.

5. The photonic apparatus of claim 4, wherein the control circuitry controls the transmit switch to selectively provide the light wave into the phase alignment waveguide through one of the waveguide inputs according to a pattern of phases between the waveguide outputs that is requested in response to the electronic control signal, and wherein the pattern of phases direct a beam of light formed from the plurality of light waves in a requested direction.

6. The photonic apparatus of claim 1, wherein the phase alignment waveguide modulates the light wave to generate the plurality of light waves with the different phases, and wherein the waveguide outputs are positioned on the phase alignment waveguide at defined locations to receive the plurality of light waves with defined phase offsets.

7. The photonic apparatus of claim 6, wherein the phase alignment waveguide is a Rotman lens.

8. The photonic apparatus of claim 1, wherein the phase alignment waveguide pre-shifts a phase of the light wave to provide the plurality of light waves having the different phases to an array of phase shifters that further modulate the different phases of the plurality of light waves to generate output light waves with final phases without providing a full range of phase shift to obtain the final phases.

9. The photonic apparatus of claim 1,
wherein the lens is exposed within a surface of the photonic apparatus to receive reflected waves from an external environment;
wherein respective ones of the receiving outputs receive respective ones of the reflected waves according to associated angles of incidence of the reflected waves with the lens, wherein the lens and the receiving waveguide are integrated as a single monolithic structure, and
wherein a receive switch is operably connected with the receiving outputs to selectively provide a respective one of the reflected waves to an optical component,
wherein the control circuitry controls the receive switch to dynamically provide one of the reflected waves from a selected one of the receiving outputs.

10. The photonic apparatus of claim 9, wherein the receiving outputs are associated with different bearings to capture respective ones of the reflected waves.

11. The photonic apparatus of claim 9, wherein the lens and the receiving waveguide form a receiving antenna for the photonic apparatus to passively receive the reflected waves from a wide field of the external environment.

12. The photonic apparatus of claim 1, wherein the photonic apparatus is integrated within a phased array light detection and ranging (LIDAR) device, and wherein the waveguide outputs emit the plurality of light waves to form a beam of light that is provided in a selected direction.

13. A photonic apparatus, comprising:
a lens exposed within a surface of the photonic apparatus to receive reflected waves from an external environment of the photonic apparatus;
a receiving waveguide operably connected with the lens, the receiving waveguide including receiving outputs located at defined positions along an opposing surface of the receiving waveguide that opposes the lens, the receiving outputs providing the reflected waves into the photonic apparatus,
wherein the receiving outputs receive the reflected waves according to associated angles of incidence of respective ones of the reflected waves with the lens,
wherein the lens and the receiving waveguide are integrated as a single monolithic structure, and
wherein the receiving waveguide is a star coupler that permits the photonic apparatus to simultaneously receive the reflected waves from multiple different bearings; and
an optical component operably connected with the receiving outputs to receive the reflected waves, wherein the receiving waveguide is operably connected with the lens across a bottom surface of the lens, and a transmitting waveguide that is a single structure that modulates a light wave to generate a plurality of light waves with different phases according to an input of waveguide inputs that received the light wave.

14. The photonic apparatus of claim 13, wherein the receiving outputs are positioned at the defined positions to coordinate the receiving outputs with different bearings to capture respective ones of the reflected waves, and
wherein the lens and the receiving waveguide form a receiving antenna for the photonic apparatus to passively receive the reflected waves from a wide field of the external environment.

15. The photonic apparatus of claim 13, wherein the optical component is one of an optical switch connected with a photodetector, an array of photodetectors, and an interferometer, and wherein the photonic apparatus is integrated within a phased array light detection and ranging (LIDAR) device.

16. The photonic apparatus of claim 13, wherein the transmitting waveguide includes transmitting inputs and transmitting outputs, the transmitting inputs being operably connected with a light source to provide the light wave into the transmitting waveguide and the transmitting outputs providing the plurality of light waves from the transmitting waveguide.

17. The photonic apparatus of claim 16, wherein the transmitting waveguide emits the plurality of light waves from the photonic apparatus to form a beam of light that is steered in a selected direction when the plurality of light waves form the beam of light.

18. A light detection and ranging (LIDAR) apparatus, comprising:
a transmission component, comprising:
a transmitting waveguide including transmitting inputs and transmitting outputs, the transmitting inputs being operably connected with a light source to provide a light wave into the transmitting waveguide and the transmitting outputs providing a plurality of light waves from the transmitting waveguide, wherein the transmitting waveguide is a first star coupler that is a single structure that modulates the light wave to generate the plurality of light waves with different phases at the waveguide outputs according to one of the waveguide inputs that received the light wave; and
a receive component, comprising:
a lens exposed within a surface of the LIDAR apparatus to receive reflected waves from an external environment of the LIDAR apparatus; and
a receiving waveguide operably connected with the lens, the receiving waveguide including receiving outputs located at defined positions along an opposing surface of the receiving waveguide that opposes the lens, the receiving outputs providing the reflected waves into the LIDAR apparatus,
wherein the lens and the receiving waveguide are integrated as a single monolithic structure, and wherein the receiving waveguide is a second star coupler that permits the LiDAR apparatus to simultaneously receive the reflected waves from multiple different bearings.

19. The LIDAR apparatus of claim 18, wherein the transmission component further includes:

a transmit switch operably connected with the transmitting inputs to selectively connect at least one of the transmitting inputs with the light source to provide the light wave into the transmitting waveguide to cause the transmitting outputs to provide the light wave according to a defined pattern of phases; and control circuitry operably connected with the transmit switch, the control circuitry dynamically activating the at least one of the transmitting inputs according to an electronic control signal.

\* \* \* \* \*